United States Patent [19]

Cruccu

[11] 4,219,346
[45] Aug. 26, 1980

[54] APPARATUS FOR THE PRODUCTION OF LARGE GLASS CONTAINERS

[75] Inventor: Antonio Cruccu, Milan, Italy

[73] Assignee: Industria Macchine Impianti, Milan, Italy

[21] Appl. No.: 930,471

[22] Filed: Aug. 2, 1978

Related U.S. Application Data

[62] Division of Ser. No. 878,543, Feb. 16, 1978.

[51] Int. Cl.² .......................... C03B 9/00; C03B 9/14
[52] U.S. Cl. ........................................ 65/207; 65/242; 65/243; 65/261; 65/262; 65/264
[58] Field of Search ................. 65/242, 262, 261, 348, 65/229, 243, 264, 207, 220

[56] References Cited

U.S. PATENT DOCUMENTS

| | | | |
|---|---|---|---|
| 1,061,405 | 5/1913 | Rau | 65/242 X |
| 1,635,716 | 7/1927 | Howard | 65/261 X |
| 3,184,297 | 5/1965 | Van Zonneveld | 65/262 X |
| 3,184,298 | 5/1965 | Van Zonneveld | 65/262 X |
| 3,350,189 | 10/1967 | Nowak | 65/348 X |
| 3,622,305 | 11/1971 | Becker | 65/229 X |
| 4,002,453 | 1/1977 | Becker | 65/229 X |

*Primary Examiner*—S. Leon Bashore
*Assistant Examiner*—Frank W. Miga
*Attorney, Agent, or Firm*—Sprung, Felfe, Horn, Lynch & Kramer

[57] ABSTRACT

A process and apparatus for the manufacture of large glass containers, comprises preparing a glass gob of a predetermined weight in an automatic mechanical feeder and feeding it to a first preparatory mold at a predetermined frequency. A parison is formed in the preparatory mold, at the same frequency, the parison comprising a finished mouth of the glass container to be formed. The parison is then transferred to a second, prefinishing mold, and, at the same frequency, a prefinished parison is formed. The prefinished parison is transferred to a third, finishing mold, and, at a frequency in a ratio of from 1:1 to 1:4 of the predetermined frequency, the finished glass container is formed. The expansion of the prefinished parison is controlled by the action of compressed air conveyed to the interior of the parison from its mouth.

10 Claims, 16 Drawing Figures

DELIVERY

SETTLE BLOW

COUNTER BLOW

TRANSFER FROM BLANK MOLD TO BLOW MOLD

REHEAT

VACUUM FORMING AND INTERNAL COOLING

TAKE OUT

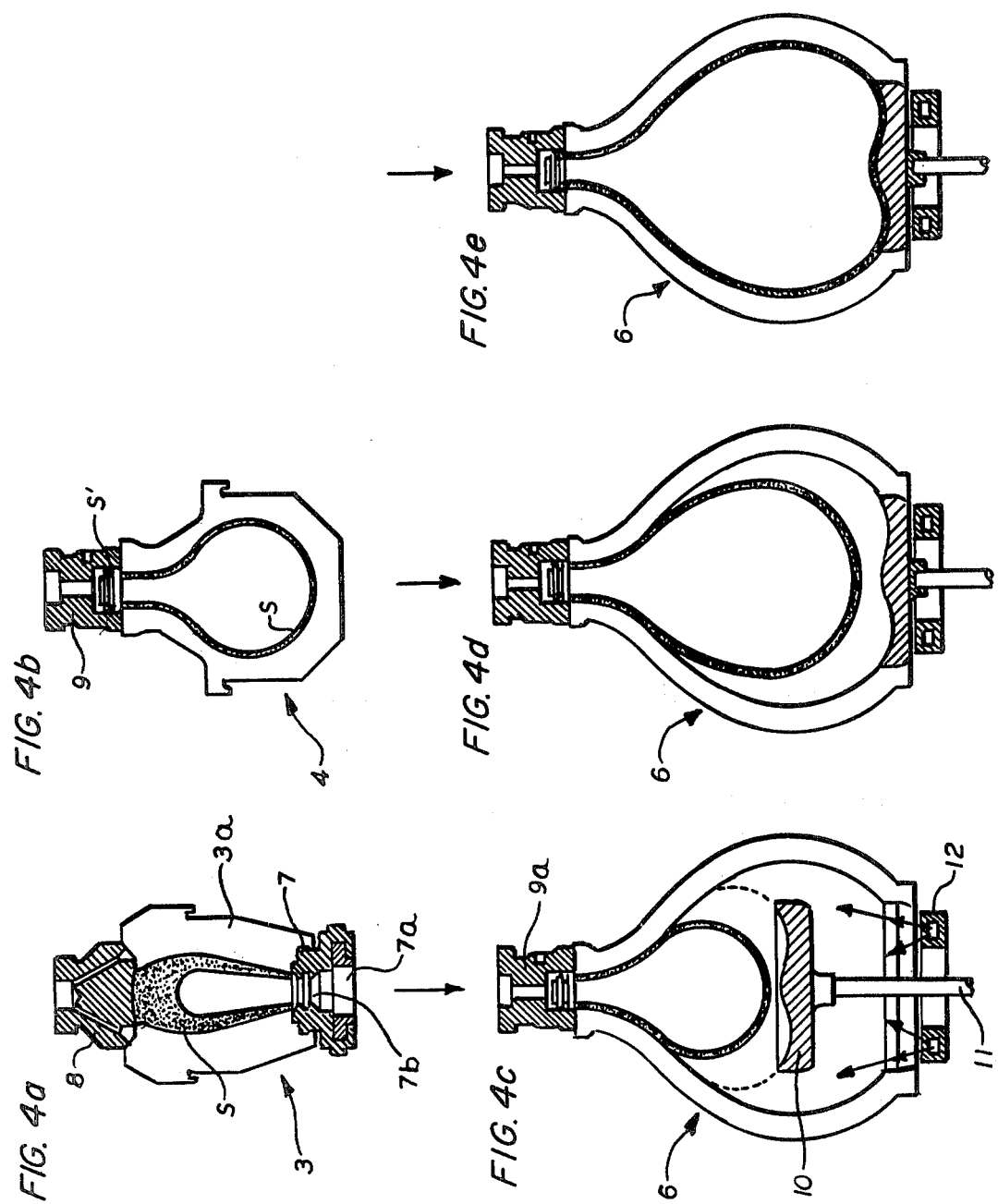

APPARATUS FOR THE PRODUCTION OF LARGE GLASS CONTAINERS

This is a division, of application Ser. No. 878,543, filed Feb. 16, 1978.

BACKGROUND OF THE INVENTION

The present invention relates to a process and an apparatus for the automatic production of large glass containers.

The term, "large containers", is to be understood here to mean containers having a capacity generally between 5 and 50 liters (in Italy, for example, the familiar carboys). These containers cannot be produced with the conventional machines for the production of bottles and thus are still being produced today mostly by mainly manual methods.

Prior art methods for the production of large glass containers, still used in various countries of the world, are discussed as follows.

In one manual method, a highly skilled worker extracts, by means of a steel tube, the proper amount of glass in an approximately spherical form, and then blows it by mouth while at the same time rotating the tube, until the finished object is obtained and is detached from the tube by contact with a cold iron.

This method is nowadays virtually abandoned for obvious reasons of low productivity except for "artistic" products.

A semi-automatic process, which is now to be considered the most widespread, calls for the manual extraction of the glass from a particular part of the melting furnace, and then for working by vacuum and compressed air in cast-iron molds, nearly all the movements of the cycle being performed by hand, and in any case all controlled by hand. The cycle can call for either two molds (preparatory + finishing) or three molds (preparatory + prefinishing + finishing), depending on the object to be produced.

In this method, a first worker takes a "gob" of glass from the furnace and places it in a first mold called the preparatory mold. Then a second worker undertakes to fashion the gob—that is, to make it into a parison—working with compressed air and suction. Then the parison is passed to a second mold, called the prefinishing mold, where a third worker fashions it—usually with compressed air—to bring it to an intermediate shape and size. Lastly, this parison is transferred to a third mold, called the finishing mold, where still another worker proceeds—again with compressed air—to put it into its final shape.

As it is easy to understand, this system, in addition to requiring much labor and being very slow, does not assure an end product of constant quality.

Although the workers assigned to the various operations are specialists, and their attention is particularly directed towards controlling the very gradual blowing of the glass container, for the fundamental purpose of obtaining a uniform thickness in its walls, this object is perforce achieved only partially.

The greatest difficulty is encountered in the final phase of the process, that is in the third, finishing mold—in which, for example in the case of 50-liter carboys, there is a change from a volume of about 10 liters in the intermediate parison to a final volume of 50 liters, with a very evident dilation of the parison—due to the fact that, precisely for more accurate visual control of the blowing, it is performed, at least initially, with the mold open. It is thus found that, on the side on which the mold is opened, it then happens that the glass undergoes a certain exposure to air and the cooled portion of the parison offers greater resistance to the dilation, while in the areas protected by the mold, and therefore the hotter areas, the glass wall tends to expand more rapidly and consequently to become thinner.

To prevent this problem from reaching the extreme of rupturing the glass wall in the thinnest zone, the worker must exercise, as stated, a careful control of the blowing, possibly supporting the glass wall in the areas where it might tend to sag—all a very long and difficult operation.

In addition to the manual methods described above, an automatic system, the Roirant system, is known, although it has not been widely adopted.

This process is characterized by the fact that the glass does not come from a gob feeder, but it drawn at a particular part of the furnace by the first mold. This mold is disposed with the open bottom down, perfectly flush with the surface of the molten glass, and, by means of a vacuum, sucks up the glass which thus fills it. A special knife cuts the glass flush with the mold. The mold then leaves the furnace and the glass is worked directly in a finishing mold or in an intermediate mold and in a finishing mold.

In substance, since the first mold must be considered as a substitute for the feeder, and no perceptible expansion can be performed in it, the cycles thus conceived must be considered as one-mold or two-mold cycles.

In this process, the expansion of the object is brought about by creating a vacuum between the parison and the walls of the molds.

Disregarding the manual process because of its obvious disadvantages, the semi-automatic process and the Roirant automatic process also have a number of disadvantages.

While the semi-automatic process makes it possible to produce a quality product it does not have constancy, which is typical of processes in which there is a conspicuous amount of manual intervention.

Furthermore, the ratio between productivity and labor required in the machine department is to be considered on the average of from 1/6 to 1/12 that of an automatic system.

The Roirant process also has a number of basic disadvantages which have prevented its widespread adoption, even though it is a process which is not new. First of all, the thickness of the glass in the various areas of the product is difficult to control and highly irregular. This produces many negative consequences, such as lesser strength in the bottle for an equal weight of glass, need to use a greater weight of glass. Furthermore, the productivity, whether it is evaluated on a per-mold or on a per-labor-unit basis, is low.

Another disadvantage of this process is that of being difficult to use, such that the production outputs (that is, the ratio of the net production to the gross production) are excessively low.

A further disadvantage is that of requiring a much lower height of the furnace with respect to the floor level of the plant than that required for all the other automatic hollow glassware operations (bottles and glasses). This makes this process difficult to incorporate into the average glass factory.

Another point against this process is the fact that, on account of the way in which the first mold is operated, and the knife that cuts the glass, this first mold is subject to frequent breakdown requiring frequent maintenance.

Symptomatic of the severity of these disadvantages is the fact that, where the cost of labor permits, glass making industries, prefer to use the semiautomatic process rather than the existing automatic processes.

SUMMARY OF THE INVENTION

Now, all these disadvantages are eliminated by the process and the apparatus of the present invention, whereby it is possible to produce in a completely automatic manner large containers of glass of constantly uniform quality and with a glass consumption that is closely limited to what is necessary.

The result is obtained by the process of the present invention, which is essentially characterized by the fact that it comprises the following phases:

Preparation of a gob of glass of a specific weight in an automatic mechanical feeder (commonly called a "gob feeder" in the glassmaking art) which feeds it to a first preparatory mold at a predetermined frequency;

Formation of a parison in the preparatory mold at the same frequency, said parison comprising a finished mouth on the glass container to be formed;

Transfer of the parison to a second, prefinishing mold, and the formation, at the same frequency, of a prefinished parison;

Transfer of the prefinished parison to a third, finishing mold, and the formation, at 1 to $\frac{1}{4}$ of the frequency, of the finished glass container, the expansion of the prefinished parison being controlled sometimes under the action of compressed air carried to the interior of the parison through its mouth, and sometimes by the opposing and proportioned actions of the compressed air, and by supporting means acting on the exterior of the parison together with compressed air introduced from the bottom—which is open at least in part—of the finishing mold.

The procedure described above is practiced in the apparatus in accordance with the present invention, which is substantially characterized by the fact that it comprises:

An automatic mechanical gob feeder adapted to form a glass gob of predetermined weight at a predetermined frequency;

A first, preparatory mold comprising a hollow, inverted principal body, with at least one opening at one end, to which there is coupled a transfer head provided with a cavity for forming the collar or mouth of the finished container, said mold being adapted for receiving the gob from the feeder and forming a first parison;

A second, prefinishing mold, comprising in turn a hollow principal body open at the top, the free edge of the said opening forming a support for the collar of the parison which is thus held in the mold;

From 1 to 4 third molds, or finishing molds, each of them comprising a hollow principal body having an upwardly facing opening whose free edge forms a support for the collar of the parison, and having furthermore an opening in the base closed by a plug which, depending upon the object to be produced, can be fixed or displaceable towards the interior of the hollow body;

Means for displacing the transfer head, with the parison attached to it by its collar, from the first to the second mold, and for releasing said head from the collar to permit the latter to rest on the free top edge of the opening in the top of the second mold;

Means for transferring the parison from the said second mold alternatively to one of said third molds, said means directly gripping the collar of the parison;

Means for feeding compressed air to the cavity of the glass parison through the mouth thereof, said means comprising a bell which is engaged with the collar of the parison and which is connected to a compressed air supply line;

And means for feeding compressed air into the hollow body of each of the third molds from their base when the bottom is opened and displaced towards the interior of the cavity of the mold.

BRIEF DESCRIPTION OF THE DRAWINGS

Other features and advantages will become evident from the description that follows of a preferred embodiment of the present invention, given with reference to the appended drawings, wherein:

FIGS. 4a–e are diagrammatic representations of the various phases of the operation of the apparatus.

DETAILED DESCRIPTION OF THE INVENTION

Figure 1A:
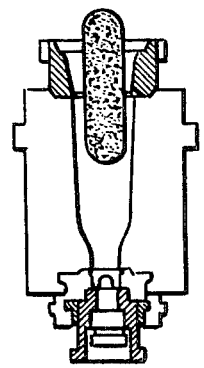
FIGS. 1a–g are diagrammatic representations of the various phases of the operation of a prior art apparatus.
Figure 1B:
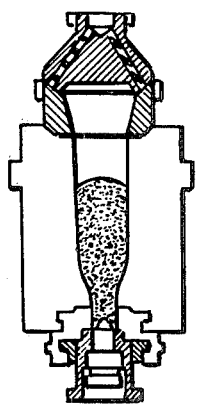
Figure 1C:
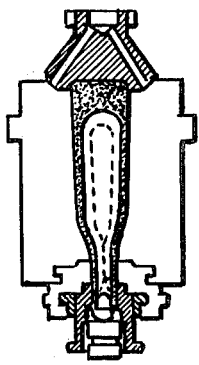
Figure 1D:
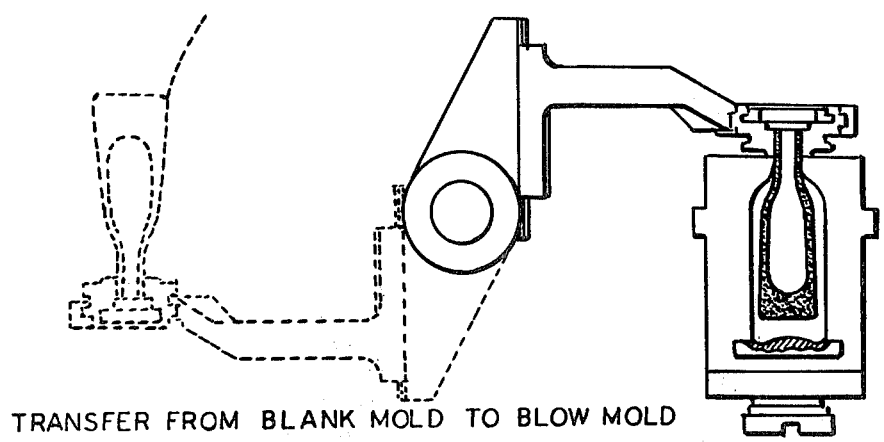
Figure 1E:
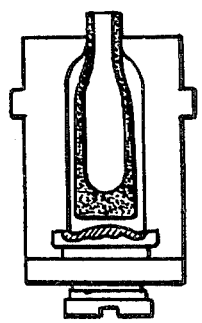
Figure 1F:
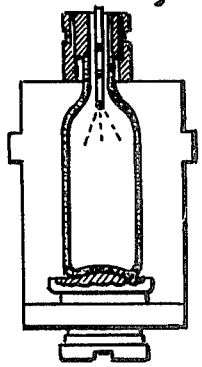
Figure 1G:
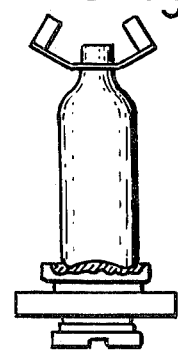
Figure 2:
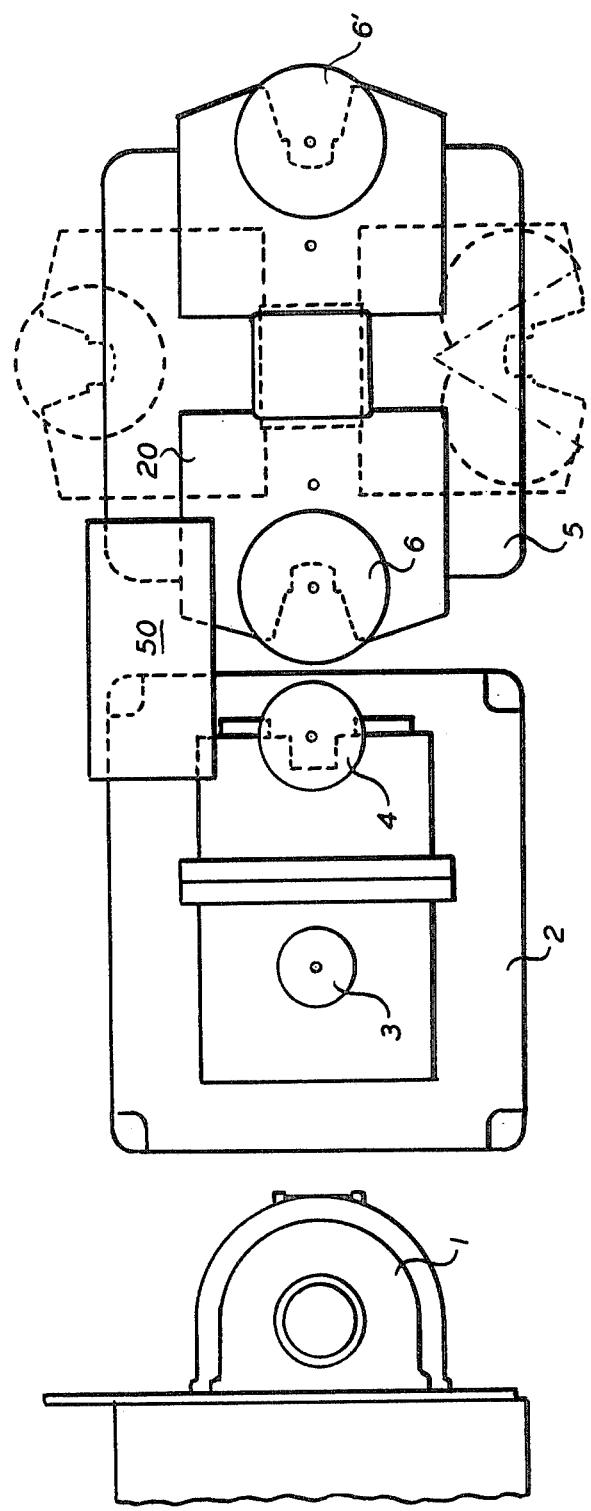
FIG. 2 shows, in a diagrammatic top plan view, the assembly of the apparatus of the invention.
Figure 3:
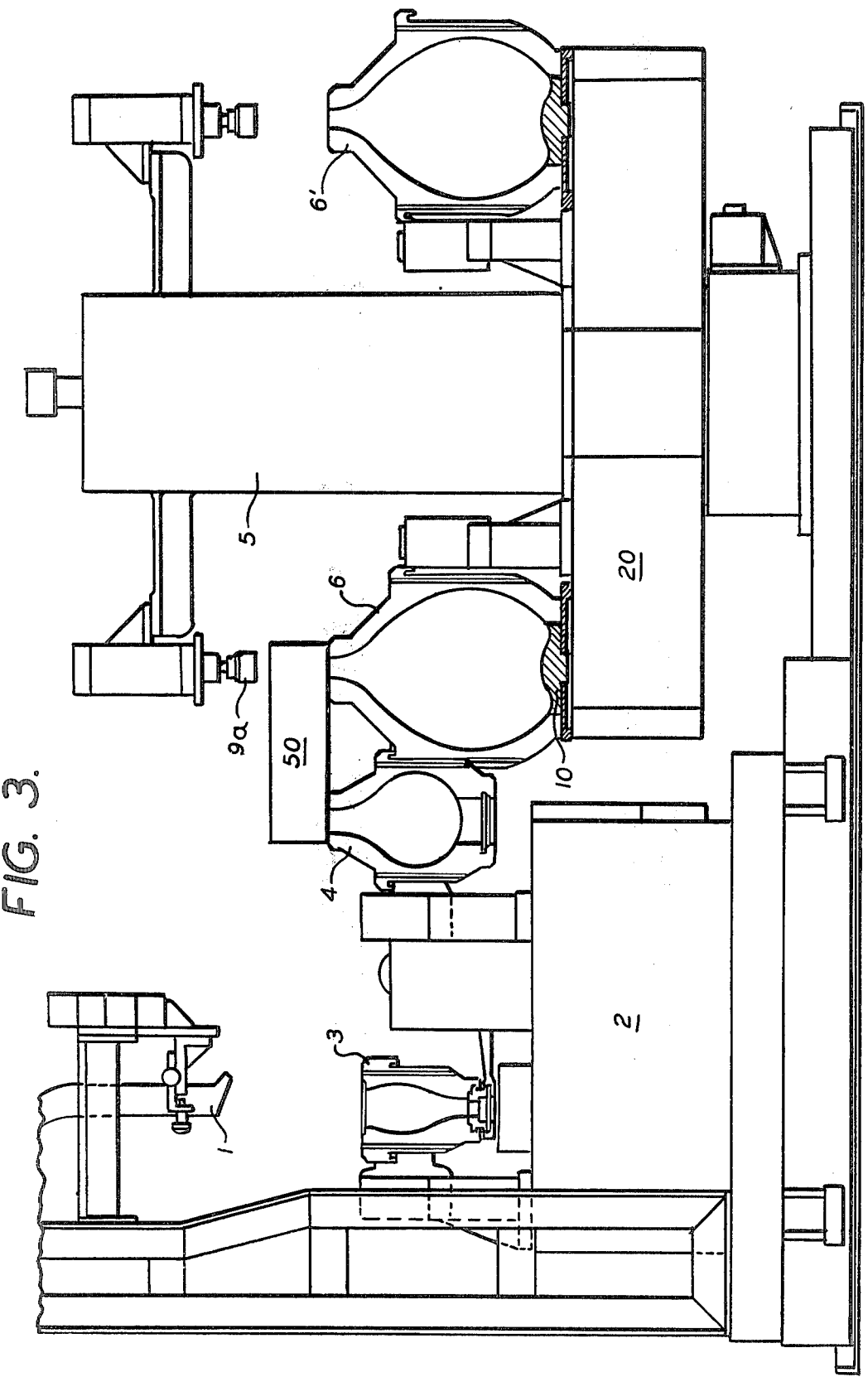
FIG. 3 is a side view of the apparatus of FIG. 2.

As shown, the apparatus of the present invention comprises an automatic mechanical gob feeder, of the type referred to briefly by the word "feeder" in the industrial glassmaking art. This is a machine capable of controlling, in a particular time sequence, the emergence of molten glass from a glass melting furnace, and of permitting the formation of a glass "gob" of predetermined weight, in order then to feed it to the first shaping mold.

The machine, indicated as a whole by the number 2, which follows the gob feeder 1, comprises a first mold 3 for forming a first parison S, and a second mold 4 for working the parison to an intermediate shape with a first increase in volume.

From the mold 4 the parison is transferred to the machine 5, which comprises a pair of molds 6 and 6' for working the intermediate parison to its final shape, with a further, substantial increase in volume.

The molds 6 and 6' are mounted in diametrically opposite positions on a revolving turret 20 of the machine 5, such as to be able to be brought alternately opposite the mold 4 of machine 2.

As shown more clearly in the diagrammatic sequence in FIG. 4, the first mold 3, the preparatory mold, is formed by a hollow body 3a, to whose open lower end there is attached a transfer head 7.

Through the upper end, which in turn is open, of the hollow body 3a, there is introduced a gob of glass coming from the gob feeder 1; the hollow body 3a is then closed at the top, in an airtight manner, by the plug 8 by metal to metal contact.

Compressed air is introduced through the passage 7a such as to induce the glass gob to assume the shape of a first parison S, whose mouth or collar is formed directly in its final shape within the cavity 7b of the same transfer head.

For the changeover to the second mold 4, the mold 3 is opened and the head 7 is removed, with the parison S attached to it by its collar by a changeover mechanism 30.

Specifically, the process including changeover from mold 3 to mold 4 can be shown with reference to FIGS. 1a–1g which show various phases of operation of a prior art machine made by the Hartford Empire Company and which is in use throughout the world. In FIG. 1a, the gob of glass is fed to the blank or first mold by the delivery system. Settle blow air is applied to the top of the blank mold in FIG. 1b to form the finish. This is followed by counterblow in FIG. 1a which forms the complete parison in the inverted position. By means of the neck ring and invert mechanism in FIG. 1d the invert takes place and the parison is transferred to the blow or second mold and the empty neck ring returns to the blank mold. The glass is reheated in FIG. 1e and the final bottle shape is made in the blow mold using vacuum forming and internal cooling in FIG. 1f while the next parison is formed in the blank mold, take-out is provided in 1g where the process ends in the prior art system. For wide mouth glasses, the process is varied slightly. The gob of glass is fed to the blank mold by the delivery system and then the parison is formed by a plunger pressing operation. Invert, reheat, final forming and take out takes place in the same sequence as for the above-described operation.

The movement of the head 7 from the mold 3 to the mold 4 is performed with a simultaneous inversion, such that the collar S' of parison S—which in mold 3 is turned downward—will instead be at the top, above the top opening of the mold 4.

Once the head 7, and the parison S attached to it by the collar, has been transferred opposite the open mold 4, the latter is closed around the parison: the head 7 opens to release the collar S' and returns to the first mold 3. The collar S' then comes to rest on the free edge of the top opening of the mold 4 (as seen in FIG. 4b), and thus sustains the parison within the cavity of the mold 4. Then a bell 9 is then brought into engagement, which seals against the top edge of the mold 4 by metal to metal contact, and through which compressed air is fed to perform a second blow and bring the parison to an intermediate shape.

It is not considered necessary to furnish further details on these first two forming phases, since the technique and the changeover mechanism is well known in plants for the production of small-size glass containers as has been explained regarding prior art FIG. 1. It is considered opportune only to state that, instead of a phase of shaping by blowing in the first mold, which is desirable for narrow-necked containers, it is possible to use a phase of shaping by pressing, particularly when it is a question of producing wide-mouth containers.

The prefinished parison produced in mold 4 is then transferred to the interior of mold 6, or 6', as the case may be, according to which one is opposite the mold 4.

Figure 5A:
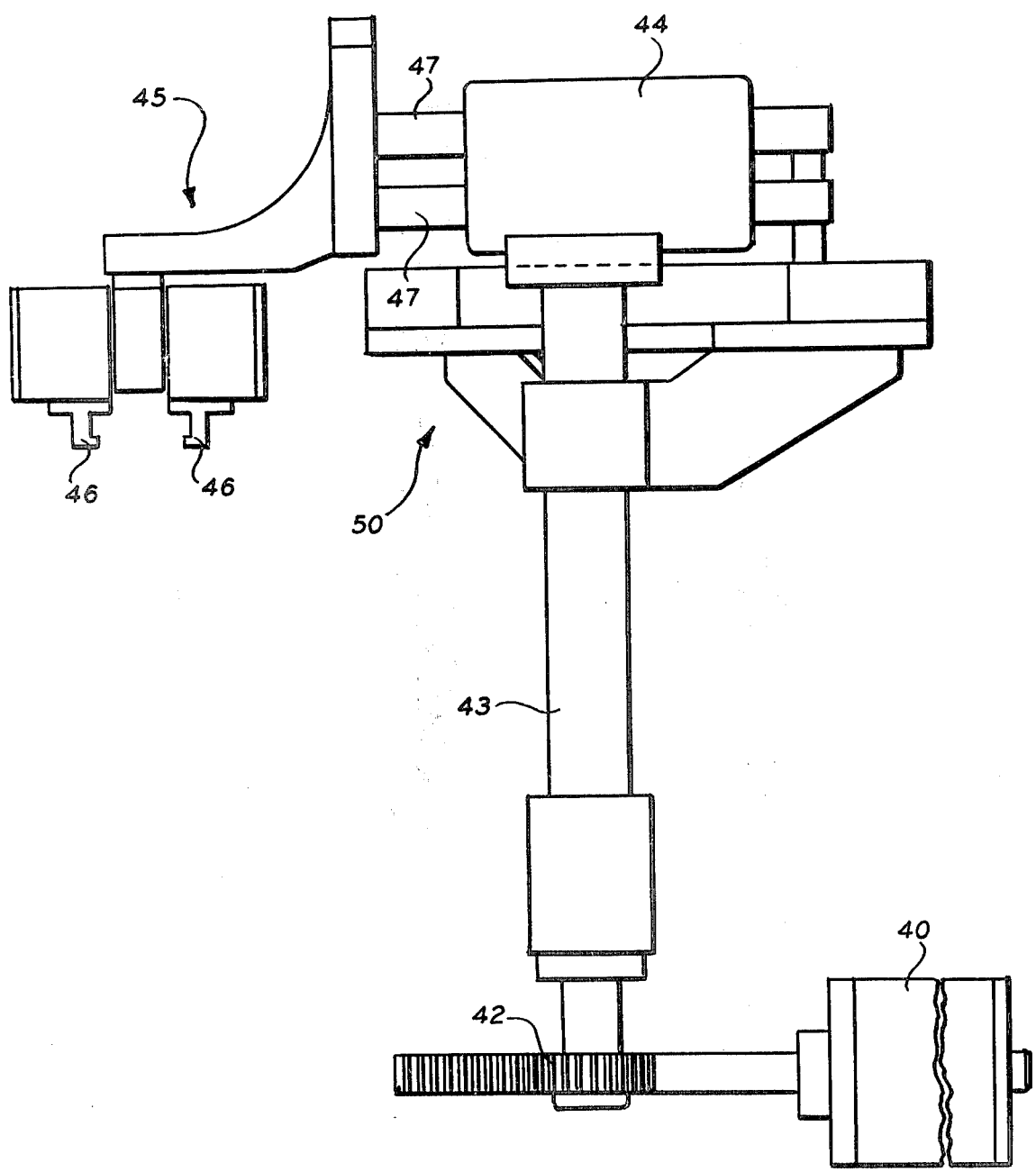
FIGS. 5a and 5b are side and top views of a transfer mechanism of the invention.
Figure 5B:
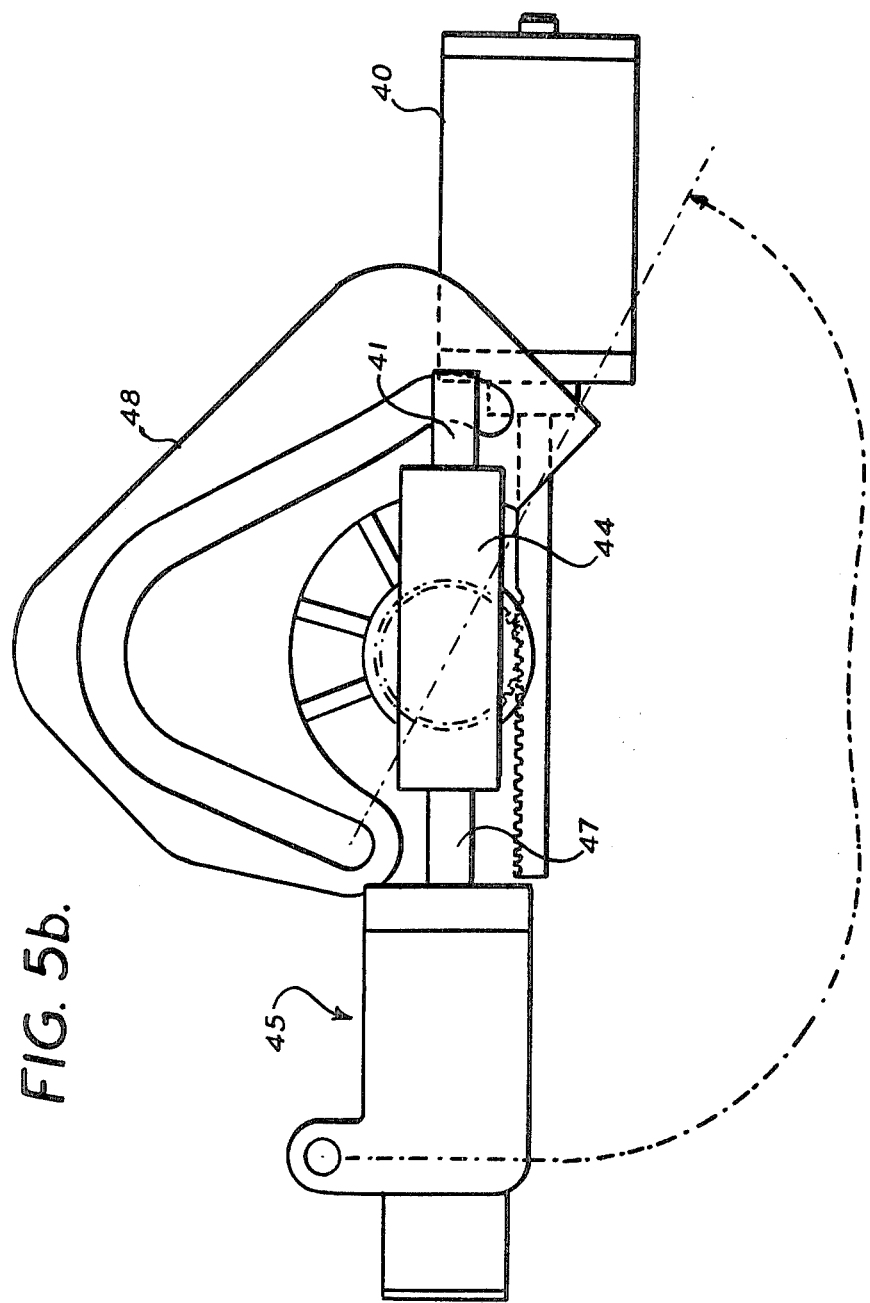

To effect this transfer, means 50 are used which are portrayed in FIGS. 5a and 5b and which grasp and directly sustain the collar S' of the parison, transferring the latter along a course adapted to accompany the continuous rotatory movement of the machine 5.

The take-out apparatus is able to:

1- Take the parison by the mouth when it is in the mold 4 (which is closed).

2- Move the parison such that it is brought into precise concentricity with mold 6 or, alternatively, 6'.

3- Continue this movement concentrically with the mold 6 (or 6') for a certain distance, so as to permit the same mold 6 (or 6') in the meantime to close and to hold up the parison when the grippers of the take-out are opened.

4- Act so that the opening and closing movement of the grippers takes place in a direction perpendicular to that of the movement of the head of the take-out, so that the grippers will not strike the mouth of the parison either on mold 4 or on mold 6 (or 6'). Since this implies two different positions of the gripper head on mold 4 and on 6 (or 6'), respectively, the head is given an additional rotatory movement on its own center.

This being stated, the apparatus operates as follows with reference to FIGS. 5a and 5b:

(a) When the blow head 9a of mold 6 (or 6') raises, a solenoid valve 40 controlled by a timer operates a cylinder having a stem 41 terminating in a rack 42. This acts on a pinion which rotates a shaft 43 on which is mounted the support 44 of the gripper mechanism 45; the latter thus brings itself precisely over the parison.

(b) The grippers 46 close (operated by the timer which acts on an air cylinder provided for the purpose).

(c) Mold 4 opens.

(d) The timer reverses the operation of the solenoid valve 40 referred to in a, and the take-out carries the parison out of mold 4 to mold 6 (or 6'). Since the distance between the center of rotation of the central shaft 43 of the take-out apparatus (see point a) and the center of the set of grippers 46 (and hence of the parison) is not constant in the course of the movement, the set of grippers is placed on the end of a sliding arm 47 which is guided by a cam 48 whose profile determines the correct interaxial distance in each position.

(e) When the set of grippers 46 (and hence the parison) is concentric with mold 6 (or 6') the mechanical engagement thereof assures that concentricity will be maintained throughout the required distance.

(f) During the movement described in d, the gripper head 45 rotates a certain number of degrees about its own axis (that is, around the axis of the parison that is being carried) so as to be in the correct angular position at the moment of unloading.

(g) At the right moment (when mold 6 or 6' is closed), the timer reverses the movement of the solenoid valve of the gripper cylinder, and the grippers open, releasing the parison which remains sustained by the mold 6 (or 6').

(h) The grippers revolve in the opposite sense with respect to f, and the equipment is ready for the next cycle.

Once the introduction of the parison into the mold 6 has been completed and the latter has been closed, a blowing bell 9a, entirely similar to bell 9, is brought into engagement with the collar S'. The shaping then takes place, depending upon the object to be produced, by various procedures, all programmable by means always available on the machine:

A single blow regulated as to time, pressure and volume.

Two successive blows regulated independently of one another as to time, pressure and volume, possibly intervaled by times in which no blowing is done and the object is allowed to expand.

Three successive independent blows accordingly as stated above.

Four successive blows as stated above, two of which are independent only as to time, but equal as to pressure and volume of the air.

The above blowing procedures can be performed either while the plug 10 remains still, or, if called for, while it is made to move vertically as described hereinafter. In this last case use is sometimes also made of an independently programmable blast of air from a hollow ring 12. In this last case, which is the most complex, the shaping is typically performed in the following manner:

The plug 10, which is carried at the top of an operating rod 11, is initially held in the raised position within the cavity of the mold 6, and leaves its base open. In the initial phase of the blow, it therefore acts as a support for the bottom of the parison, which therefore tends mainly to expand as indicated by the broken line in FIG. 4c.

At the same time, from underneath the mold 4, compressed air is injected into the cavity of the same mold, as indicated by the arrows. For this purpose one uses, for example, the hollow ring 12, provided with nozzles, or even merely with perforations, directed upwardly.

Then, as the blow continues, the plug 10 is progressively lowered and then raised to sustain, when necessary, the bottom of the parison which is gaining volume.

In the final phase the plug 10 rests on the base of the mold 6, closing the base opening (position shown in FIG. 4d); the entry of compressed air from below is shut off. The blow is continued until the parison has reached its final shape (as illustrated in FIG. 4e).

The discharge of the air contained in the space between the inner wall of each of the molds and the outside wall of the container being formed therein and consequently increasing in volume, is accomplished through slits or perforations provided, in a known manner, in the walls of the molds.

It is pointed out that, in the forming phase in each of the third molds 6 and 6', the injection of compressed air into the parison is performed in synchronism with the movement of the plug 10 and of the injection of compressed air from underneath, for example by means of an electronic general timing system for the machine, which is not part of the present invention, on the basis of sequences predetermined in relation to the size and to the configuration of the object to be produced.

The compressed air intake for the blowing is made by a blowing head which rises and lowers in cooperation with the suitable pneumatic cylinder and is controlled, for each blowing head by an electrovalve which opens or closes driven by the electronic timing system, a pressure regulator and a flow governor.

The beginning and end blowing time, the pressure and the air capacity are regulated by these three elements.

It has been found in practice that, once the optimum conditions for the forming of a given container have been determined, the apparatus and the process of the present invention make it possible to reproduce these conditions in a very constant and precise manner; it is therefore possible to produce, without any further corrective manual intervention, containers which have final characteristics of high quality and are extremely uniform.

These results furthermore carry the following additional advantages:

The better possibility of control of the thickness of the glass at the various points on the object makes it possible to produce objects of equal mechanical strength and less weight of glass: differences have been found, with respect to the same objects produced by other cycles, of up to 25% of the weight.

The structure of the cycle of the present invention, both of itself and insofar as it permits the production of lighter objects of equal volume, permits considerable increases of productivity with respect to other cycles, both with regard to the production per unit and in proportion to the labor required.

The fact that this line is supplied by a feeder leads to the fundamental advantage of being able to be supplied by glass melting furnaces which are entirely similar in construction and location to those used for serving machines which produce ordinary bottles, while the other processes existing for the production of large containers have in common the characteristic of requiring a furnace having structures partially different from a conventional, at a serious disadvantage to the rational structure of the glass factory.

The structure of the machines makes it possible to feed with the same gob feeder either one or two or at most three production units as described above, all, of course, used for the production of the same object (or of compatible objects, i.e., having the same glass weight, the same mouth, and not too dissimilar shapes), thus obtaining two or three times the production of a single line, without the need for a larger labor force.

It can be understood, however, that the invention is not limited to the details of the embodiment described above and given in a purely exemplary manner, but that, instead of such details, there can be many variants, all within the knowledge of a technician of the art, without thereby departing from the scope of the invention.

What is claimed is:

1. In an apparatus for the manufacture of large glass containers, comprising:

a first preparatory mold;

means for preparing a glass gob of a predetermined weight and feeding it to the first preparatory mold at a predetermined frequency to form a parison at the same frequency comprising a finished mouth of the glass container to be formed;

a second prefinishing mold;

means for linearly transferring the parison to the second, prefinishing mold;

means for forming, at the same frequency, a prefinished parison in the second mold;

two to four finishing molds;

means for transferring the prefinished parison to one finishing mold; and means for finishing the prefinished parison in the finishing mold by blowing air into the prefinished parison;

the improvement comprising:

a. means for continuously rotating the finishing molds in a circular path at a rotational speed in a ratio of from 1:2 to 1:4 to the predetermined frequency; and b. said means for transferring the prefinished parison from the second mold to one finishing mold comprising means for feeding the unfinished parison at the predetermined frequency along a path substantially diametrical to the circular path;

wherein two to four finishing molds are utilized for each first and second mold when the third molds are rotated at the appropriate ratio with respect to the predetermined transfer frequency.

2. The apparatus according to claim 1, wherein:

the first preparatory mold comprises a hollow, inverted principal body, having at least one opening at one end, a transfer head engageable therewith and having a cavity for forming the collar of the finished container;

the second, prefinishing mold, comprises a hollow principal body open at the top, the free edge of said opening forming a support for the collar of the parison;

the finishing mold comprises a hollow principal body having an opening at the top, whose free edge forms a support for the collar of the parison, and having furthermore an opening at the base thereof, a moving plug displaceable towards the interior of the hollow body and away therefrom to thereby close the base.

3. The apparatus according to claim 2, wherein the means for continuously rotating comprises a rotary machine having a revolving turret on which the finishing molds are mounted.

4. The apparatus according to claim 2, comprising an adjustable height operating rod having an upper end on which each movable plug of each finishing mold is mounted.

5. The apparatus according to claim 1, wherein the means for transferring the parison from the first mold to the second mold, comprises means for releasing the transfer head from the collar to permit the latter to rest on the free edge of the top opening of the second mold.

6. The apparatus according to claim 2, wherein said means for transferring the prefinished parison from the second mold to one of the finishing molds comprises means for gripping and directly sustaining the collar of the parison.

7. The apparatus according to claim 3, wherein said means for transferring the prefinished parison from the second mold to one of the finishing molds comprises means following a path adapted to correspond to the rotatory movement of said turret supporting the finishing molds.

8. The apparatus according to claim 2, wherein said means for blowing air into the cavity of the parison comprises a bell which engages the collar of the parison and which is connected to a compressed air feed line.

9. The apparatus according to claim 8, wherein said bell comprises sealing means for producing a hermetic seal on the free edge of the top opening of said second and finishing molds.

10. The apparatus according to claim 2, wherein said means for blowing air includes means for blowing from below into each finishing mold comprising a hollow ring fed with compressed air and provided with upwardly directed discharge nozzles, said hollow ring being disposed beneath the opening in the base of the hollow body of the finishing mold.

* * * * *